(12) United States Patent
Manor et al.

(10) Patent No.: US 10,534,810 B1
(45) Date of Patent: Jan. 14, 2020

(54) COMPUTERIZED SYSTEMS AND METHODS FOR ENRICHING A KNOWLEDGE BASE FOR SEARCH QUERIES

(71) Applicant: Google Inc., Mountain View, CA (US)

(72) Inventors: Ran El Manor, Savyon (IL); Yaniv Leviathan, Savyon (IL)

(73) Assignee: GOOGLE LLC, Mountain View, CA (US)

( * ) Notice: Subject to any disclaimer, the term of this patent is extended or adjusted under 35 U.S.C. 154(b) by 991 days.

(21) Appl. No.: 15/056,183

(22) Filed: Feb. 29, 2016

Related U.S. Application Data

(63) Continuation of application No. 14/718,821, filed on May 21, 2015, now abandoned.

(51) Int. Cl.
*G06F 16/58* (2019.01)
*G06F 16/2457* (2019.01)

(52) U.S. Cl.
CPC .... *G06F 16/5866* (2019.01); *G06F 16/24573* (2019.01); *G06F 16/24578* (2019.01)

(58) Field of Classification Search
CPC .......... G06F 16/5866; G06F 16/24578; G06F 16/24576
See application file for complete search history.

(56) References Cited

U.S. PATENT DOCUMENTS

| | | | |
|---|---|---|---|
| 7,809,192 B2 | 10/2010 | Gokturk et al. | |
| 8,520,909 B2 | 8/2013 | Leung et al. | |
| 9,536,146 B2 * | 1/2017 | Zheng | G08G 1/0112 |
| 2009/0106203 A1 | 4/2009 | Shi et al. | |
| 2010/0332475 A1 * | 12/2010 | Birdwell | G06K 9/6224 707/737 |
| 2011/0142300 A1 * | 6/2011 | Zhang | G06K 9/00295 382/118 |
| 2012/0128239 A1 * | 5/2012 | Goswami | G06T 7/0002 382/162 |
| 2012/0274657 A1 * | 11/2012 | Araoka | G06F 19/321 345/619 |
| 2012/0303615 A1 * | 11/2012 | Goswami | G06Q 30/02 707/723 |
| 2012/0308121 A1 * | 12/2012 | Datta | G06K 9/6263 382/155 |
| 2013/0265450 A1 * | 10/2013 | Barnes, Jr. | H04N 5/77 348/207.1 |
| 2013/0266215 A1 * | 10/2013 | Brookhart | G06K 9/00 382/162 |
| 2014/0254923 A1 | 9/2014 | Vidal Calleja et al. | |

(Continued)

*Primary Examiner* — James Trujillo
*Assistant Examiner* — Hubert Cheung
(74) *Attorney, Agent, or Firm* — Middelton Reutlinger

(57) ABSTRACT

Systems and methods are disclosed for enriching a knowledge base for search queries. According to certain embodiments, images are assigned annotations that identify entities contained in the images. An object entity is selected among the entities based on the annotations and at least one attribute entity is determined using annotated images containing the object entity. A relationship between the object entity and the at least one attribute entity is inferred and stored in the knowledge base. In some embodiments, confidence may be calculated for the entities. The confidence scores may be aggregated across a plurality of images to identify an object entity.

21 Claims, 10 Drawing Sheets

(56) References Cited

U.S. PATENT DOCUMENTS

| | | | | |
|---|---|---|---|---|
| 2014/0289323 | A1* | 9/2014 | Kutaragi | G06Q 50/01 709/203 |
| 2014/0324823 | A1* | 10/2014 | Iorio | G06F 16/5866 707/722 |
| 2015/0036919 | A1* | 2/2015 | Bourdev | G06K 9/6256 382/156 |
| 2015/0086133 | A1* | 3/2015 | Grady | G06F 16/5866 382/278 |
| 2015/0154232 | A1* | 6/2015 | Ovsjanikov | G06F 16/583 707/780 |
| 2015/0234827 | A1* | 8/2015 | Lin | G06F 16/338 707/729 |
| 2016/0140147 | A1* | 5/2016 | Sun | G06F 16/5838 707/772 |
| 2016/0224593 | A1* | 8/2016 | Qiu | G06N 20/00 |
| 2017/0046427 | A1* | 2/2017 | Tang | G06F 16/54 |
| 2017/0351934 | A1* | 12/2017 | Ruan | G06F 17/2765 |

\* cited by examiner

COMPUTERIZED SYSTEMS AND METHODS FOR ENRICHING A KNOWLEDGE BASE FOR SEARCH QUERIES

CROSS REFERENCE TO RELATED APPLICATION

This application is a continuation of and claims the benefit of priority of U.S. patent application Ser. No. 14/718,821, filed May 21, 2015. The disclosure of the above-referenced application is expressly incorporated herein by reference in its entirety.

BACKGROUND

The present disclosure generally relates to the field of information processing and database techniques. More specifically, and without limitation, the exemplary embodiments described herein relate to computerized systems and methods for enriching a knowledge base for search queries. The information used to enrich a knowledge base may be learned or inferred from analyzing images and other data sources.

A knowledge base is an important repository of structured and unstructured data. The data stored in a knowledge base may include information such as entities, facts about entities, and relationships between entities. This information can be used to assist with or satisfy user search queries processed by a search engine. Examples of knowledge bases include Google Knowledge Graph and Knowledge Vault, Microsoft Satori Knowledge Base, DBpedia, Yahoo! Knowledge Base, and Wolfram Knowledgebase.

The data stored in a knowledge base may be enriched or expanded by harvesting information from a wide variety sources. For example, entities and facts may be obtained by crawling text included in Internet web pages. As another example, entities and facts may be collected using machine learning algorithms. All gathered information may be stored in a knowledge base to enrich the information that is available for processing search queries.

SUMMARY

Consistent with the present disclosure, computer-implemented systems and methods are provided for enriching a knowledge base for search queries. Information used to enrich the knowledge base may be learned or inferred from analyzing images and other data sources. Embodiments consistent with the present disclosure include computer-implemented systems and methods for annotating images and selecting object entities contained in those images. In addition, systems and methods consistent with the present disclosure may determine relationships between the object entities and attribute entities, and store the relationships in a knowledge base.

In accordance with one exemplary embodiment, a system is provided for enriching a knowledge base for search queries. The system includes a memory that stores a set of instructions and at least one processor in communication with the memory for executing the set of instructions. The at least one processor may be configured with the set of instructions to assign annotations to images stored in a database. The annotations may identify entities contained in the images. The at least one processor may further be configured to select an object entity among the entities based on the annotations and determine at least one attribute entity using annotated images containing the object entity. The at least one processor may also be configured to infer a relationship between the object entity and the at least one attribute entity and store the relationship in a knowledge base.

In accordance with one exemplary embodiment, a computer-implemented method is provided for enriching a knowledge base for search queries. The method includes assigning annotations to images stored in a database. The annotations may identify entities contained in the images. An object entity among the entities may be selected based on the annotations. At least one attribute entity may be determined using the annotated images containing the object entity. A relationship between the object entity and the at least one attribute entity may be inferred and stored in a knowledge base.

In accordance with yet another exemplary embodiment, a computer readable storage medium is provided including instructions executable by at least one processor to perform operations, including assigning annotations to images stored in a database. The annotations may identify entities contained in the images. The operations may also include selecting an object entity among the entities based on the annotations and determining at least one attribute using the annotated images containing the object entity. The operations may further include inferring a relationship between the object entity and the at least one attribute entity and storing the relationship in a knowledge base.

Before explaining certain embodiments of the present disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as in the abstract, are for the purpose of description and should not be regarded as limiting.

As such, those skilled in the art will appreciate that the conception and features upon which this disclosure is based may readily be utilized as a basis for designing other structures, methods, and systems for carrying out the several purposes of the present disclosure. Furthermore, the claims should be regarded as including such equivalent constructions insofar as they do not depart from the spirit and scope of the present disclosure.

BRIEF DESCRIPTION OF THE DRAWINGS

The accompanying drawings, which are incorporated in and constitute part of this specification, and together with the description, illustrate and serve to explain the principles of various exemplary embodiments.

DETAILED DESCRIPTION OF EXEMPLARY EMBODIMENTS

Embodiments of the present disclosure provide improved systems and methods for enriching a knowledge base for search queries. The information used to enrich a knowledge base may be learned or inferred from analyzing images and other data sources. In accordance with some embodiments, object recognition technology is used to annotate images stored in databases or harvested from Internet web pages. The annotations may identify who and/or what is contained in the images. The disclosed embodiments can learn which annotations are good indicators for facts by aggregating annotations over object entities and facts that are already known to be true. Grouping annotated images by object entity helps identify the top annotations for the object entity. Top annotations can be selected as attributes for the object entities and relationships can be inferred between the object entities and the attributes. As used herein, the term "inferring" refers to operations where an entity relationship is inferred from or determined using indirect factors such as image context, known entity relationships, and data stored in a knowledge base to draw an entity relationship conclusion instead of learning the entity relationship from an explicit statement of the relationship such as in text on an Internet web page. The inferred relationships may be stored in a knowledge base and subsequently used to assist with or respond to user search queries processed by a search engine.

The disclosed embodiments also provide improved systems and methods for calculating confidence scores for annotations assigned to images. Confidence scores may reflect likelihood that an entity identified by an annotation is actually contained in an image. Confidence scores may be calculated on a per-image basis and aggregated over groups of annotated images in order to improve image recognition and annotation techniques.

According to the disclosed embodiments, images may be assigned annotations that identify entities contained in the images. An object entity among the entities may be selected based on the annotations. An attribute entity for the object entity may be determined using annotated images containing the object entity. A relationship between the object entity and the attribute entity may be inferred and stored in a knowledge base for processing search queries.

Reference will now be made in detail to the exemplary embodiments implemented according to the disclosure, the examples of which are illustrated in the accompanying drawings. Wherever possible, the same reference numbers will be used throughout the drawings to refer to the same or like parts.

Figure 1:
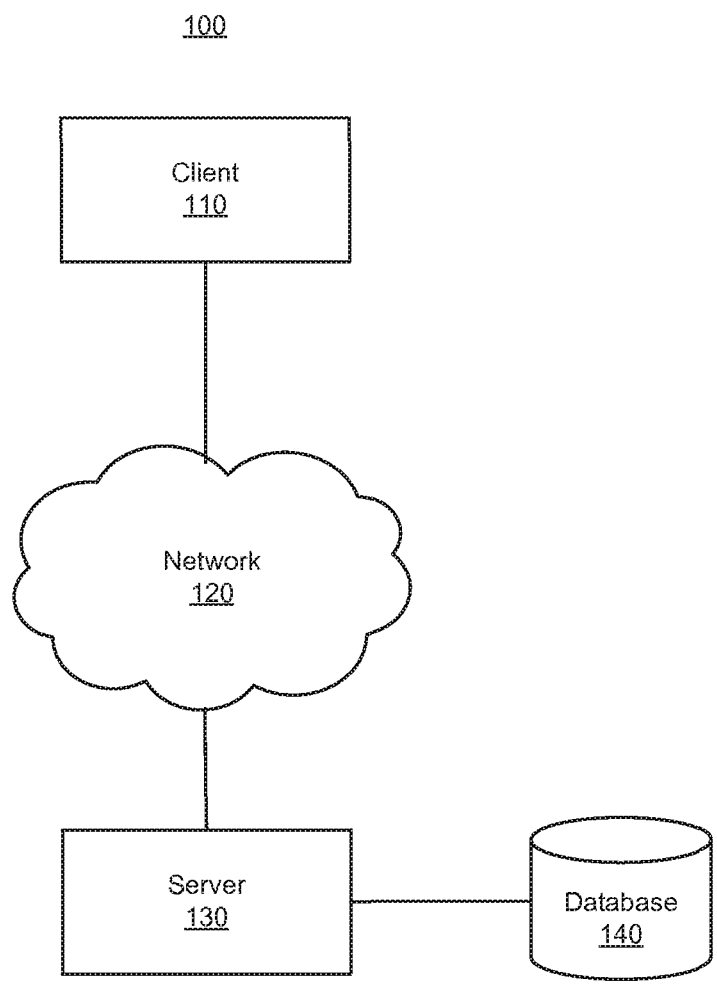
FIG. 1 is a diagram of an example system environment for implementing embodiments consistent with the present disclosure.

FIG. 1 depicts an exemplary system environment 100 for implementing embodiments of the present disclosure. As shown in FIG. 1, system environment 100 includes a number of components. It will be appreciated from this disclosure that the number and arrangement of these components is exemplary only and provided for purposes of illustration. Other arrangements and numbers of components may be utilized without departing from the teachings and embodiments of the present disclosure.

As shown in the example embodiment of FIG. 1, system environment 100 may include one or more user devices or clients 110. By way of example, client 110 may include smartphones, tablets, netbooks, electronic readers, personal digital assistants, personal computers, laptop computers, desktop computers, large display devices, and/or other types of electronics or communication devices. In some embodiments, client 110 is implemented with hardware devices and/or software applications running thereon. Also, in some embodiments, client 110 may implement aspects of the present disclosure without the need for accessing another device, component, or network, such as network 120. In some embodiments, server 130 may implement aspects and features of the present disclosure without the need for accessing another device, component, or network 120. In yet other embodiments, client 110 may be configured to communicate to and/or through network 120 with other clients and components, such as server 130 and database 140, and vice-versa.

In some embodiments, network 120 may include any combination of communications networks. For example, network 120 may include the Internet and/or any type of wide area network, an intranet, a metropolitan area network, a local area network (LAN), a wireless network, a cellular communications network, etc. In some embodiments, client 110 may be configured to transmit requests (e.g., requests based on input provided by one or more users) or other data through network 120 to an appropriate server, such as, for example, server 130. For example, client 110 may be configured to transmit search queries to server 130. In some aspects, client 110 may also be configured to receive information from server 130 through network 120. For example, client 110 may be configured to receive data (e.g., HTML data including search results and/or data elements) responsive to search queries from server 130. Moreover, as described in more detail below, client 110 may be configured, for example, to receive, from server 130, data responsive to multiple queries by multiple users sent from a single client device or multiple client devices.

Server 130 may include one or more servers configured to communicate and interact with client 110 and database 140. In some embodiments, server 130 may implement or provide one or more search engines. Server 130 may be a general-purpose computer, a mainframe computer, or any combination of these components. In certain embodiments, server 130 may be standalone computing system or apparatus, or it may be part of a subsystem, which may be part of a larger system. For example, server 130 may represent distributed servers that are remotely located and communicate over a communications medium (e.g., network 120) or over a dedicated network, for example, a LAN. Server 130 may be implemented, for example, as a server, a server system comprising a plurality of servers, or a server farm comprising a load balancing system and a plurality of servers.

In some embodiments, a user of client 110 can submit a query to a search engine hosted by server 130. When the user submits a query, the query may be transmitted from client 110 through network 120 to server 130. Server 130 may include, or may be connected to database 140 and a search engine. Server 130 may respond to the query by generating search results, which are transmitted through network 120 to client 110 in a form that can be presented to the user (e.g., a search results web page to be displayed in a web browser running on client 110 or a knowledge panel displayed on the search result web page).

In some embodiments, when the query is received by the search engine of server 130, the search engine identifies resources that match the query. The search engine may also identify a particular "snippet" or section of each resource that is relevant to the query (or of the highest ranked resources that are relevant to the query). The search engine may include an indexing engine that indexes resources (e.g., web pages, images, or news articles on the Internet) found in a corpus (e.g., a collection or repository of content), an index database or knowledge base that stores the index information, and a ranking engine (or other software) to rank the resources that match the query. The indexing engine can index information using traditional techniques. In some embodiments, the search engine (or indexing engine thereof) can index image annotations, object entities, attribute entities, relationships between object entities and attribute entities, and facts learned about object entities using the techniques of the present disclosure.

Database 140 may include one or more logically and/or physically separate databases configured to store data. The data stored in database 140 may be received from servers 130, from client 110 and/or may be provided as input using conventional methods (e.g., data entry, data transfer, data uploading, etc.). The data stored in the database 140 may take or represent various forms including, but not limited to, documents, presentations, textual content, images, photos, audio files, video files, user profile information, and a variety of other electronic data, or any combination thereof. In some embodiments, database 140 includes a knowledge base that stores data such as entities, facts about entities, and relationships between entities. In some embodiments, database 140 includes an image database configured to store images, photos, and the like.

In some embodiments, database 140 may be implemented using any suitable form of a computer-readable storage medium. In some embodiments, database 140 may be maintained in a network attached storage device, in a storage area network, or combinations thereof, etc. Furthermore, database 140 may be maintained and queried using numerous types of database software and programming languages, for example, SQL, MySQL, IBM DB2®, Microsoft Access®, PERL, C/C++, Java®, etc. Although FIG. 1 shows database 140 associated with server 130, database 140 may be a standalone database that is accessible via network 120 or database 140 may be associated with or provided as part of a system or environment that may be accessible to client 110 and/or other components.

In some embodiments, server 130 may assign annotations to images. The images may be obtained from the Internet, database 140, client 110, and/or any other source. In some embodiments, server 130 crawls the Internet for images and stores the obtained images in database 140. In some embodiments, server 130 searches database 140 or the Internet for images using one or more search queries.

Server 130 may assign annotations to images using various object recognition techniques. Object recognition techniques include, for example, edge detection, optical character recognition, face detection, geometric hashing, scale-invariant feature transform, grayscale matching, pose clustering, gradient matching, speeded up robust features (SURF), and any other object recognition techniques known in the art. In some embodiments, server 130 learns to assign annotations based on training performed on combinations of known image feature-annotation pairs. For example, server 130 may analyze images that have already been annotated and learn to correlate image features with the assigned annotations. Server 130 may use one or more of the above-described object recognition techniques to collect feature data from other images and assign annotations based on the learned image feature-annotation correlations. Assigned annotations may be stored in database 140, for example, in a knowledge base. In some embodiments, the assigned annotations are stored as metadata or another suitable form of information assigned to images.

An annotation may identify an entity contained in an image. An entity may be a person, place, thing, or concept. For example, an image taken at a baseball game may contain entities such as "baseball fan", "grass", "baseball player", "baseball stadium", etc. An entity may also be a specific person, place, thing, or concept. For example, the image taken at the baseball game may contain entities such as "Nationals Park" and "Ryan Zimmerman".

Server 130 may select object entities based on the annotations. An object entity may be an entity selected among the entities contained in a plurality of annotated images. Object entities may be used to group images to learn facts about those object entities. In some embodiments, server 130 may select a plurality of images and assign annotations to those images. Server 130 may select an object entity based on the entity contained in the greatest number of annotated images as identified by the annotations. For example, a group of 50 images may be assigned annotations that identify George Washington in 30 of those images. Accordingly, server 130 may select George Washington as the object entity if 30 out of 50 annotated images is the greatest number for any identified entity.

In some embodiments, server 130 may calculate confidence scores for the annotations. Confidence scores may reflect a likelihood that an entity identified by an annotation is actually contained in an image. In other words, a confidence score quantifies a level of confidence in an annotation being accurate. In some embodiments, confidence scores may be calculated by server 130 using a template matching algorithm. The template matching algorithm may compare the annotated image with a template image. The template image may be an image that is known to contain the entity identified by the annotation. In some embodiments, the comparison may be based on a number or percentage of pixels of the annotated image that overlap or match respective pixels of the template image (or vice-versa). For example, server 130 may compare each pixel of the annotated image with a respective pixel in the template image to determine whether the pixels match. Server 130 may assign confidence scores that reflect a percentage of pixels that match between the annotated image and template image.

Server 130 may determine that pixels match based on various factors such as, for example, pixel value. In some embodiments, pixel value may be represented as a single value such as a 1-bit value or an 8-bit value. For example, in the case of monochrome images, a 1-bit value (e.g., a binary value of "1" or "0") may be used to identify whether a pixel is a background pixel or a foreground pixel. As another example, in the case of grayscale images, an 8-bit value (e.g., an integer value of 0 to 255) may be used to reflect the luminous intensity of a pixel. In some embodiments, pixel value may be represented as a vector that includes three values of eight or more bits. For example, in the case of color images, a vector of three 8-bit values may be used to represent the luminous intensities of the red, green, and blue color components of each pixel. In some embodiments, server 130 may determine that pixels are a match when their respective pixel values are the same. In other embodiments, server 130 may determine that pixels are a match when their respective pixel values are within a threshold distance from each other.

In some embodiments, the template matching algorithm compares a region of the annotated image identified to contain an entity with a region of the template image that is known to contain the entity. Accordingly, the efficiency of the template matching algorithm can be improved by limiting the comparison to regions of interest in the annotated and template images.

The server 130 may assign a confidence score to the annotations on a scale of 0.0 to 1.0, a qualitative scale (e.g., unlikely, somewhat likely, likely), or any other indicator of how likely an entity identified by an annotation is actually contained in an image. When a scale of 0.0 to 1.0 is used, an exact match of the entity identified by the annotation to the entity contained in the template image may be assigned a confidence score of 1.0. A confidence score of less than 1.0 may be assigned when server 130 determines the entity identified by the annotation is less than an exact match for the entity contained in the template image.

Server 130 may aggregate confidence scores across a plurality of images to determine overall confidence scores. An overall confidence score may be determined for each entity identified in the plurality of images. In some embodiments, server 130 determines the overall confidence scores by averaging the per-image confidence scores calculated for annotations across the plurality of images. For example, server 130 may assign an overall confidence score of 0.76 to the entity George Washington identified by annotations with confidence scores of 0.83, 0.78, and 0.67.

Server 130 may use the overall confidence scores to select object entities. For example, in some embodiments, server 130 may determine an entity contained in the greatest number of annotated images as described above. Server 130 may select the entity contained in the greatest number of annotated images as the object entity when the entity's overall confidence score is greater than a threshold score. The threshold score may be selected based on numerous factors including, for example, the number of images over which confidence scores are aggregated. When the entity's overall confidence score is less than the threshold score, server 130 compares the overall confidence score for the entity contained in the next greatest number of annotated images. Server 130 may continue these operations until it identifies an entity with an overall confidence score greater than the threshold score. However, in some embodiments when no entity is assigned an overall confidence score greater than the threshold score, server 130 may stop attempting to identify an object entity from the grouped images and search for another batch of images to annotate and use to identify an object entity.

Server 130 may determine attribute entities using annotated images containing the object entity. In some embodiments, server 130 uses only images assigned annotations identifying the object entity that have confidence scores greater than a threshold score. An example threshold score may be 0.8 or any other threshold score. Limiting images to those having annotations identifying the object entity with high confidence scores ensures that the most relevant attribute entities are determined.

An attribute entity may be an entity determined among the entities contained in the annotated images containing the object entity. Attribute entities may be entities other than the object entity or a subset of the object entity. In some embodiments, server 130 may group annotated images containing the object entity and select an attribute entity based on the entity contained in the greatest number of grouped images as identified by the annotations. For example, a group of 30 annotated images containing the object entity "George Washington" may be assigned annotations that identify 20 images containing "Martha Washington."

Accordingly, server 130 may select "Martha Washington" as an object entity if 20 out of 30 annotated images is the greatest number for any identified entity. In some embodiments, attribute entities may be assigned overall confidence scores, and server 130 may select attribute entities having overall confidence scores greater than a threshold score.

Server 130 may infer relationships between object entities and attribute entities and store the inferred relationships in a knowledge base (e.g., database 140). In some embodiments, server 130 infers a relationship between an object entity and an attribute entity based on a spatial relationship between the object entity and attribute entity in a threshold number of grouped images. For example, server 130 may infer a relationship when greater than 50% of images grouped for the object entity "Michael Jordan" contain a basketball attribute entity in proximity to "Michael Jordan" such as in his hand (e.g., that Michael Jordan is a basketball player). In some embodiments, server 130 infers a relationship between an object entity and an attribute entity based on a known relationship between the object entity and another attribute entity. For example, when the object entity is selected as "Michael Jordan" and it is known that "Michael Jordan" is a "basketball player," server 130 may infer a relationship between "Michael Jordan" and the "Chicago Bulls" based on the known relationship between "Michael Jordan" and the game of basketball (e.g., that Michael Jordan plays basketball for the Chicago Bulls). Server 130 may search a knowledge base (e.g., database 140) for known relationships between object entities and attribute entities. In some embodiments, server 130 may infer relationships between an object entity and an attribute entity based on a search query. Server 130 may search for images using a search query that includes an object entity and a proposed relationship. For example, the search query may include "grizzly bear eats" which includes the object entity "grizzly bear" and the proposed relationship "eats". Server 130 may identify attribute entities in the images produced by the search and assign annotations to those entities. Server 130 may infer relationships between the object entity and attribute entities in the annotated images based on the text included in the search query. For example, server 130 may infer that the object entity "grizzly bear" eats an attribute entity "fish" included in one or more annotated images based on the proposed relationship "eats" included in the search query. Server 130 may use known facts and relationships associated with attribute entities that are stored in database 140 to verify the inferred relationship is a valid relationship. For example, server 130 may search database 140 for facts and relationships associated with the attribute entity "fish" and determine that "fish" is a type of food. Server 130 may therefore verify the relationship "grizzly bear eats fish" based on the known fact that "fish" may be food.

Server 130 may assist with or satisfy search queries using inferred relationships stored in a knowledge base. For example, server 130 may receive a search query associated with an object entity from client 110. The search query may include a question such as, for example, "What basketball team does Michael Jordan play for?" Server 130 may satisfy the search query using the inferred relationship between Michael Jordan and the Chicago Bulls. Accordingly, server 130 may provide client 110 with the attribute entity "Chicago Bulls".

Additional relationships may be inferred between the object entity and other attribute entities using newly inferred relationships. For example, server 130 may search an image database (e.g., database 140) and/or the Internet for additional images based on an inferred relationship. Server 130 may annotate images produced by the search, group annotated images containing the object entity, and determine an attribute entity using the grouped images. In some embodiments, server 130 may infer a relationship between the object entity and attribute entity based on a known relationship. For example, server 130 may infer a relationship between the object entity and attribute entity based on a known relationship between the attribute entity and another attribute entity, or based on a known relationship between the object entity and another attribute entity. In some embodiments, server 130 may infer a relationship between the object entity and attribute entity based on a plurality of known relationships. For example, server 130 may infer a relationship between the object entity and attribute entity based on known relationships between the object entity and another attribute entity, and the attribute entity and the other attribute entity.

Figure 2:
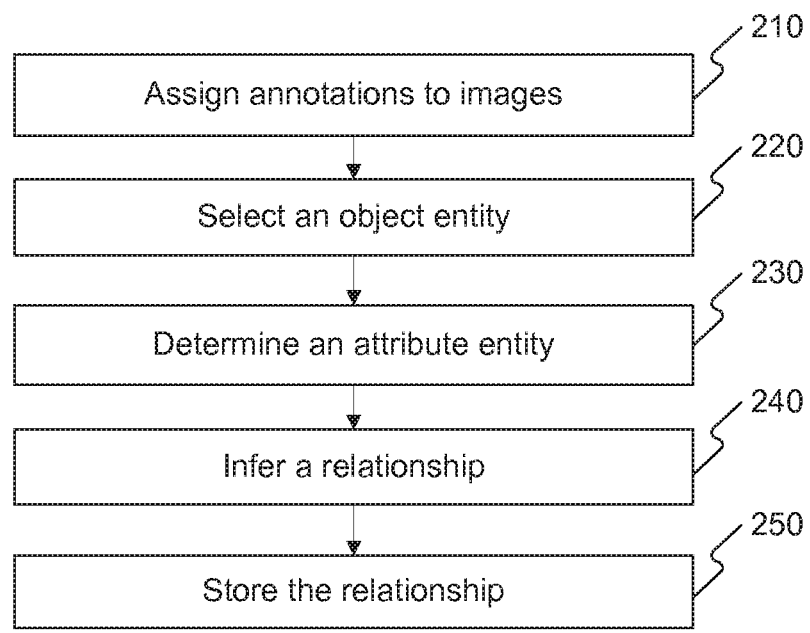
FIG. 2 is a flow diagram depicting an example process for enriching a knowledge base for search queries, in accordance with an embodiment of the present disclosure.

FIG. 2 depicts a flowchart of an example method 200, consistent with some embodiments and aspects of the present disclosure. Method 200 may be implemented, for example, for enriching a knowledge base for search queries. The number and sequence of operations in FIG. 2 are provided for purposes of illustration and may be modified, enhanced, substituted, or otherwise changed, in view of the present disclosure. In some embodiments, method 200 may be implemented as one or more computer programs executed by one or more processors. Moreover, in some embodiments, method 200 may be implemented by a server (e.g., server 130 having one or more processors executing one or more computer programs stored on a non-transitory computer readable medium) or a user device (e.g., client 110 having one or more processors executing one or more computer programs stored on a non-transitory computer readable medium). In some embodiments, method 200 may be implemented by a combination of a server and a client.

In some embodiments, example method 200 may include assigning annotations to images at 210. For example, the server may obtain images from an image database and/or from crawling Internet web pages. The annotations may identify entities contained in the images. Annotations may be stored as metadata or another suitable form of information assigned to images in a knowledge base. The server may assign the annotations to the images using the object recognition techniques described above in reference to FIG. 1. In some embodiments, the server may calculate confidence scores for the annotations using the techniques described above in reference to FIG. 1.

In some embodiments, example method 200 may include selecting an object entity at 220. The object entity may be selected among entities that are identified in the images by the assigned annotations. For example, the server may select an object entity based on the entity contained in the greatest number of annotated images as identified by the annotations. When the server calculates confidence scores for the annotations, the object entity may be selected based on the confidence scores and the entity contained in the greatest number of annotated images. For example, the server may aggregate confidence scores across the annotated images to determine overall confidence scores for each entity. The object entity may be selected from entities having overall confidence scores above a threshold score. Accordingly, the object entity may be selected as the entity contained in the greatest number of annotated images having an overall confidence score above the threshold score.

In some embodiments, example method 200 may include determining an attribute entity at 230. For example, the server may determine at least one attribute using the annotated images containing the object entity. Annotated images may be grouped based on which annotated images contain the object entity. In other words, the server may determine the attribute entity using only images that contain the object entity. In some embodiments, the server determines the attribute entity based on the entity contained in the greatest number of grouped images as identified by the annotations. The attribute entity may be an entity other than the object entity. In some other embodiments, when the server calculates confidence scores for the annotations, the server determines the attribute entity based on the entity contained in the greatest number of grouped images having an overall confidence score above the threshold score.

In some embodiments, example method 200 may include inferring a relationship at 240. For example the server may infer a relationship between the object entity and the attribute entity. The relationship may be inferred based on one or more known relationships and/or information stored in a knowledge base. In some embodiments, example method 200 may include storing the inferred relationship in a knowledge base at 250. The inferred relationship may be used to satisfy search queries processed by a search engine and/or search for additional images to infer additional relationships for the object entity.

Figure 3A:
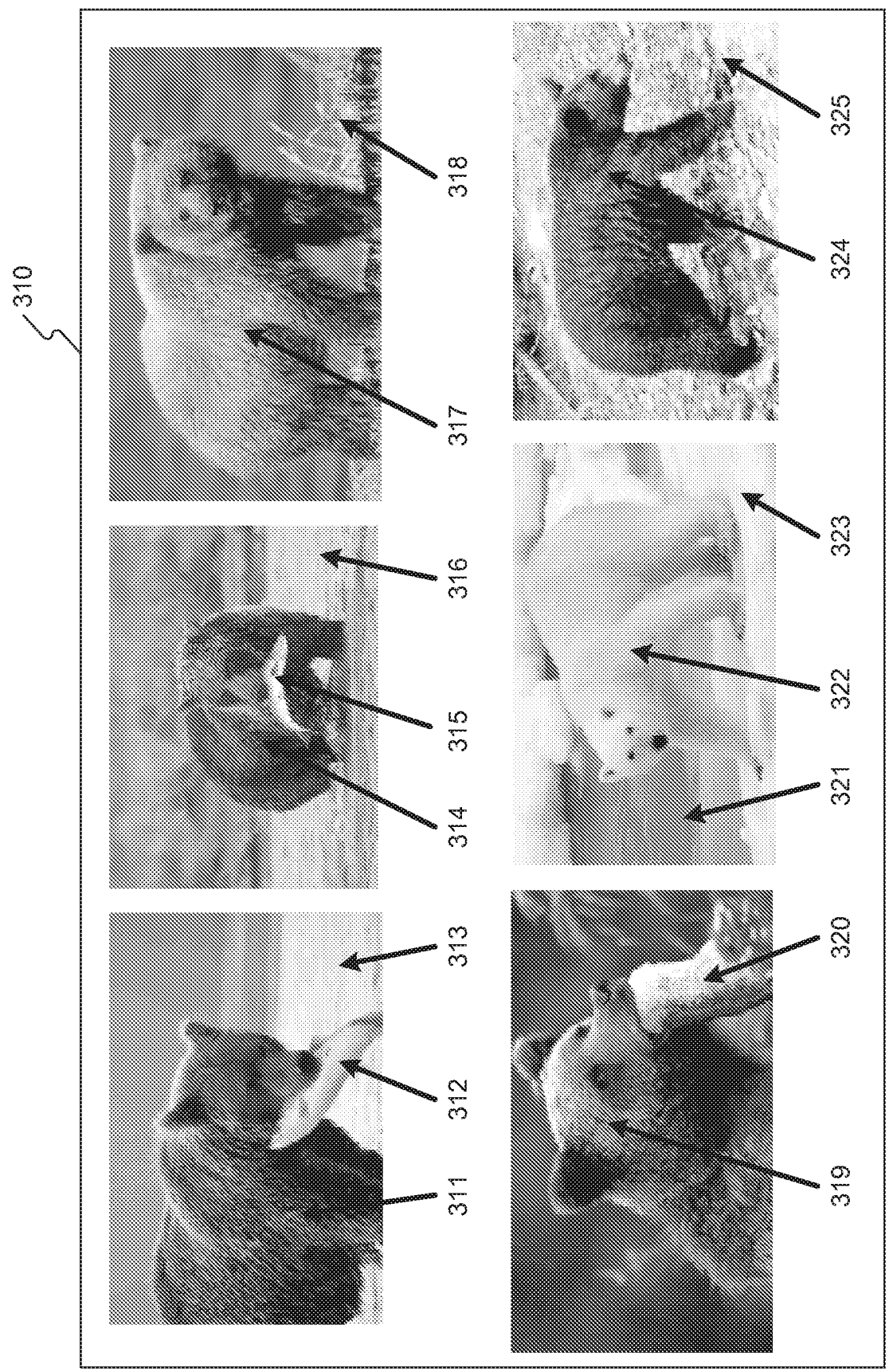
FIG. 3A-3D illustrate an example implementation for inferring entity relationships from images, in accordance with an embodiment of the present disclosure.

FIGS. 3A-3D depict an example implementation of inferring entity relationships from images, according to some embodiments of the present disclosure. As shown in FIG. 3A, images 310 stored in a database (e.g., database 140 of FIG. 1) may be annotated. The annotations may identify entities contained in images 310. For example, images 310 shown in FIG. 3A have been annotated, and entities 311-325 have been identified. Entities 311, 314, 317, and 319 may be "grizzly bear" entities; entities 312, 315, and 320 may be "fish" entities; entities 313, 316, and 321 may be "water" entities; entities 318 and 325 may be "grass" entities; entity 322 may be a "polar bear" entity; and entity 324 may be a "black bear" entity. Accordingly, since the "grizzly bear" entity is the entity contained in the greatest number of images 310, "grizzly bear" may be selected as the object entity.

Figure 3C:
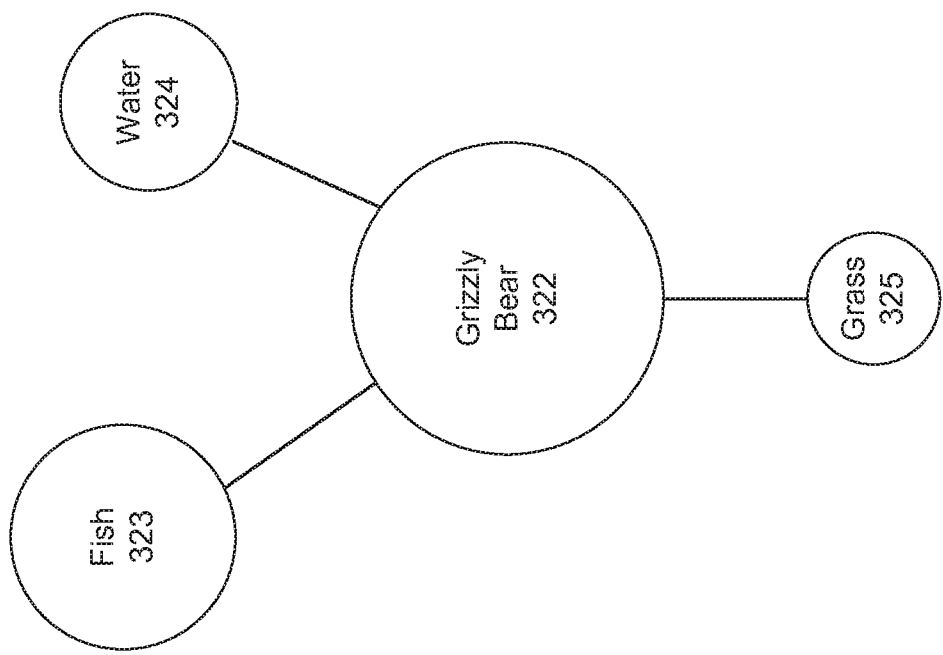
Figure 3B:
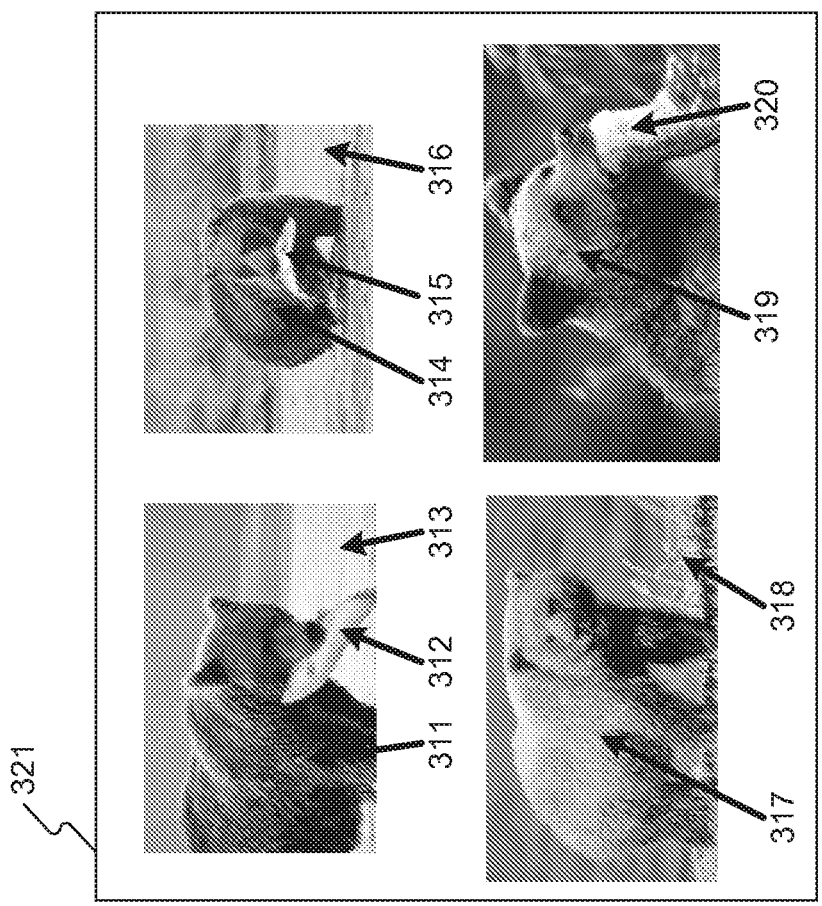

Images 310 may be grouped in order to determine an attribute entity among the remaining entities. For example, as shown in FIG. 3B, a subset of images 310 have been grouped into group 321 based on grizzly bear object entity 322. Based on the remaining entities contained in group 321, fish entity 323, water entity 324, and grass entity 325 are identified as candidate attribute entities. Since fish entity 323 is the entity other than grizzly bear object entity 322 contained in the greatest number of images 310 in group 321, fish entity 323 may be selected as the attribute entity, as shown in FIG. 3C.

Figure 3D:
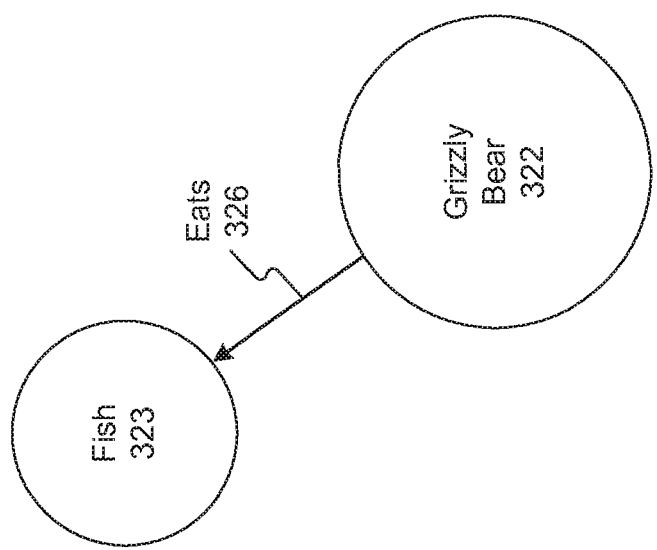

A relationship between grizzly bear object entity 322 and fish attribute entity 323 may be inferred. For example, as shown in FIG. 3D, "eats" may be a relationship 326 inferred between grizzly bear object entity 322 and fish attribute entity 323. Relationship 326 may be inferred using the techniques described above in reference to FIG. 1. For example, a server using object recognition techniques (e.g., server 130) may infer relationship 326 as "eats" due to the proximity of fish attribute entity 323 to grizzly bear object entity 322's mouth in a majority of images in group 321. Relationship 326 may be stored in a knowledge base along with grizzly bear object entity 322 and fish attribute entity 323. The combination of relationship 326, grizzly bear object entity 322, and fish attribute entity 323 may represent a fact about grizzly bears (i.e., that grizzly bears eat fish). Newly learned relationship 326 (and the fact it represents)

may be used to respond to search queries such as, for example, "What do grizzly bears eat?"

Figure 4:
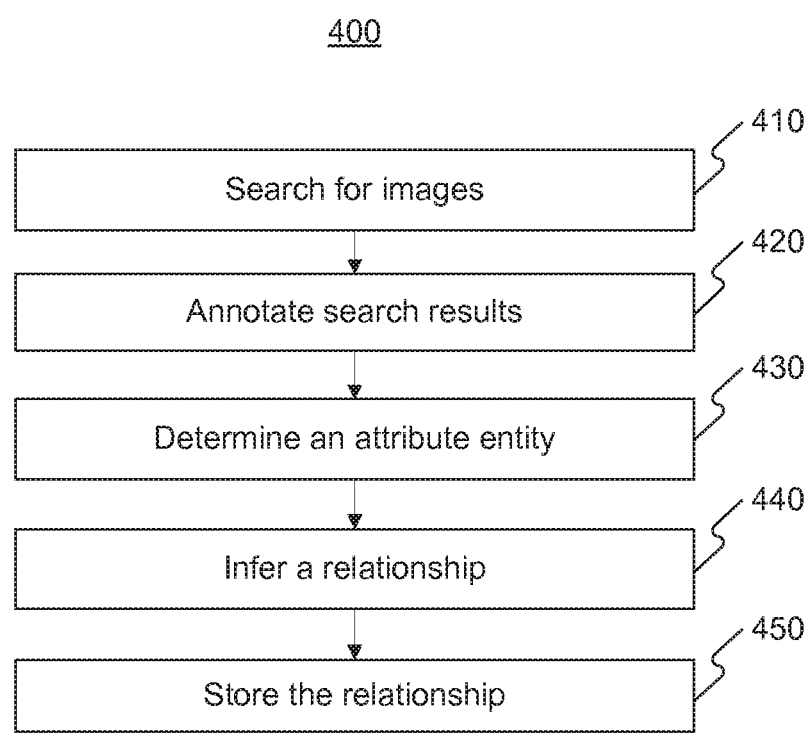
FIG. 4 is a flow diagram depicting example steps of another process for enriching a knowledge base for search queries, in accordance with an embodiment of the present disclosure.

FIG. 4 depicts a flowchart of an example method 400, consistent with some embodiments and aspects of the present disclosure. Method 400 may be implemented, for example, for enriching a knowledge base for search queries. The number and sequence of operations in FIG. 4 are provided for purposes of illustration and may be modified, enhance, substituted, or otherwise changed, in view of the present disclosure. In some embodiments, method 400 may be implemented as one or more computer programs executed by one or more processors. Moreover, in some embodiments, method 400 may be implemented by a server (e.g., server 130 having one or more processors executing one or more computer programs stored on a non-transitory computer readable medium) or a user device (e.g., client 110 having one or more processors executing one or more computer programs stored on a non-transitory computer readable medium). In some embodiments, method 400 may be implemented by a combination of a server and a client.

In some embodiments, example method 400 may include searching for images at 410. For example, the server may search an image database (e.g., database 140) or the Internet to identify images containing an object entity of interest. In some embodiments, the server may search for images using an object entity as a search term (e.g., "George Washington"). In some embodiments, the server may search for images using a search string based on the object entity, attribute entity, and relationship between the object entity and attribute entity. For example, the server may search for images using the search string "Michael Jordan playing basketball". The search term and/or search string may be selected to produce images containing the object entity of interest.

In some embodiments, example method 400 may include annotating images produced by the search at 420. The annotations may identify entities contained in the images. Annotations may be stored as metadata or another suitable form of information assigned to images in a knowledge base. The server may assign the annotations to the images using the object recognition techniques described above in reference to FIG. 1. In some embodiments the server may calculate confidence scores for the annotations using the techniques described above in reference to FIG. 1.

In some embodiments, example method 400 may include determining an attribute entity at 430. For example, the server may determine at least one attribute using the annotated images. In some embodiments, the server may group annotated images based on which annotated images contain the object entity of interest. Accordingly, any images produced by the search that did not contain the object entity of interest may be removed by the server to ensure the most accurate attribute entities are identified.

In some embodiments, example method 400 may include inferring a relationship at 440. The server may infer a relationship between the object entity and the attribute entity. The relationship may be inferred based on one or more known relationships and/or information stored in a knowledge base. For example, the server may infer the relationship between the object entity and the attribute entity based on a relationship between the object entity and another attribute entity, between the attribute entity and another attribute entity, or both. As an example, a relationship between "Michael Jordan" and the "Chicago Bulls" (e.g., Michael Jordan plays for the Chicago Bulls) may be inferred based on a relationship between "Michael Jordan" and the game of basketball (e.g., Michael Jordan plays basketball) and a relationship between the game of basketball and the "Chicago Bulls" (e.g., Chicago Bulls is a basketball team). In some embodiments, example method 400 may include storing the inferred relationship in a knowledge base at 450. The inferred relationship may be used to satisfy search queries or search for additional images to infer additional relationships for the object entity.

Figure 5A:
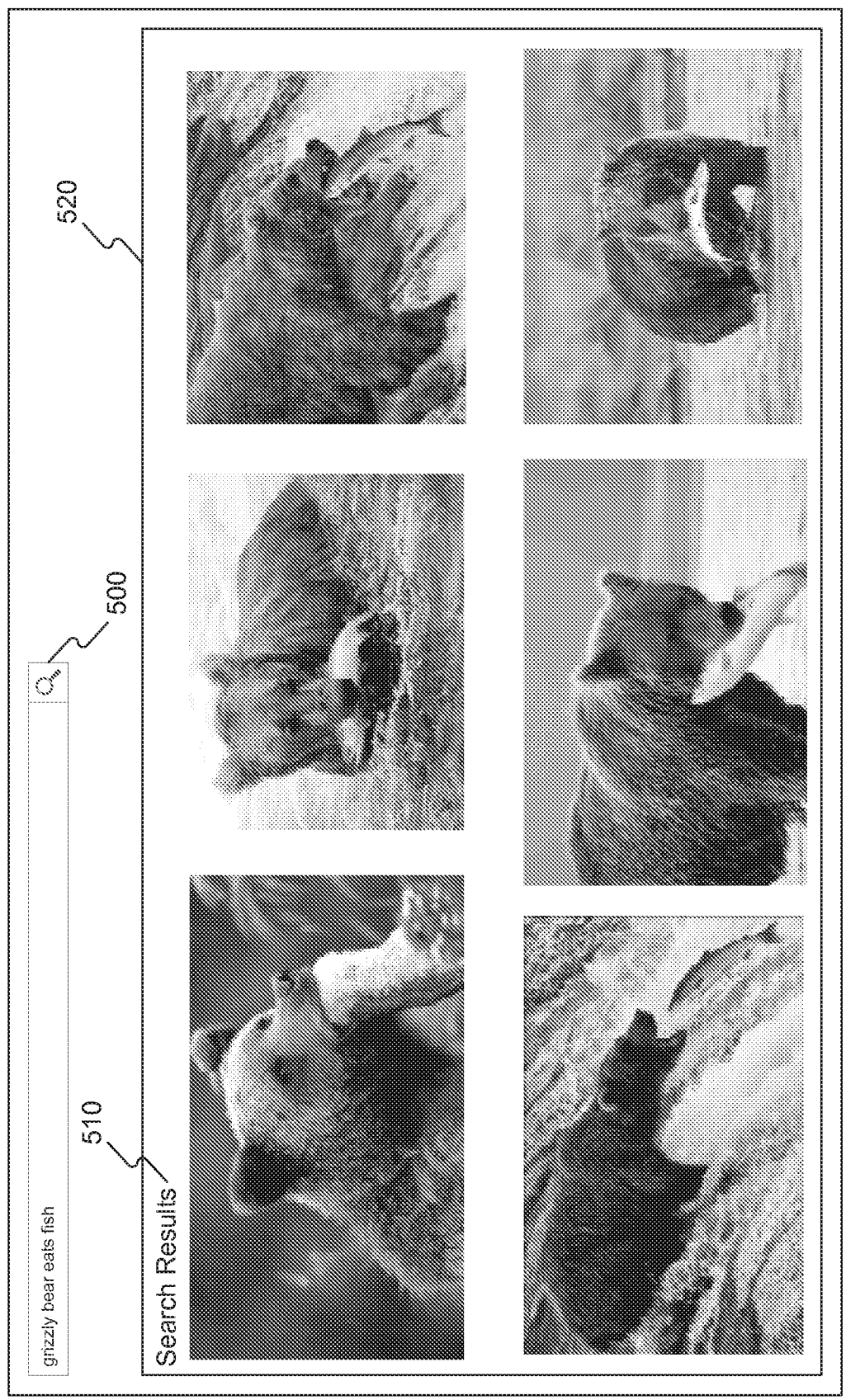
FIG. 5A-5D illustrate another example implementation for inferring entity relationships from images, in accordance with an embodiment of the present disclosure.

FIGS. 5A-5D depict an example implementation of inferring entity relationships from images, according to some embodiments of the present disclosure. As shown in FIG. 5A, a search string "grizzly bear eats fish" may be used as input 500 to a search engine (e.g., hosted on server 130) for identifying images containing grizzly bears. The search engine may produce search results 510 containing a plurality of images 520.

Figure 5B:
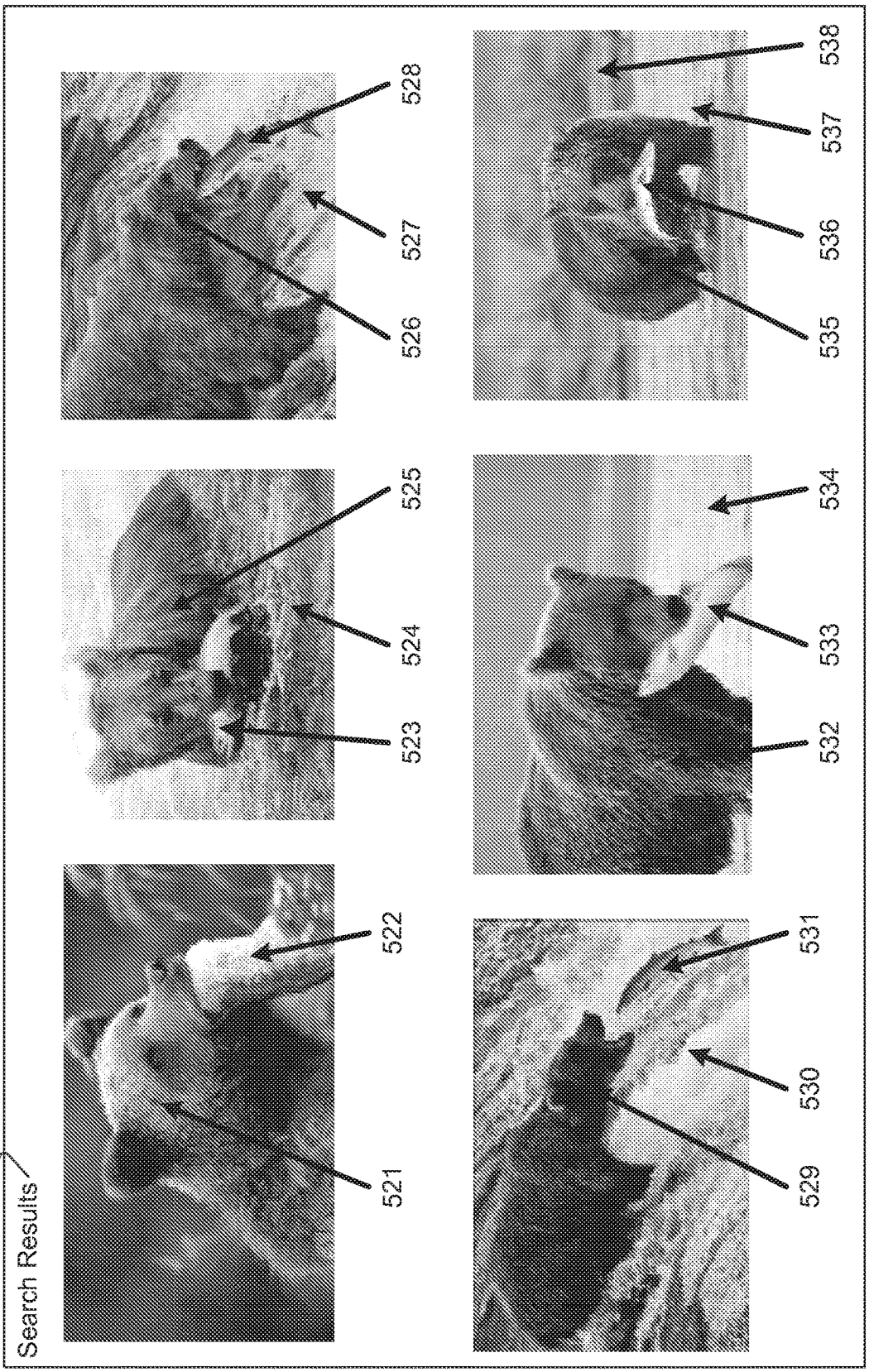
Figure 5D:
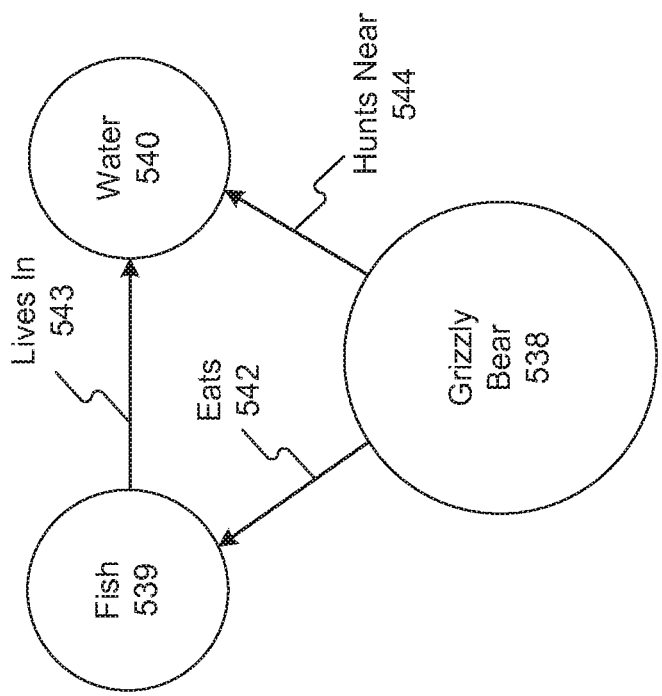
Figure 5C:
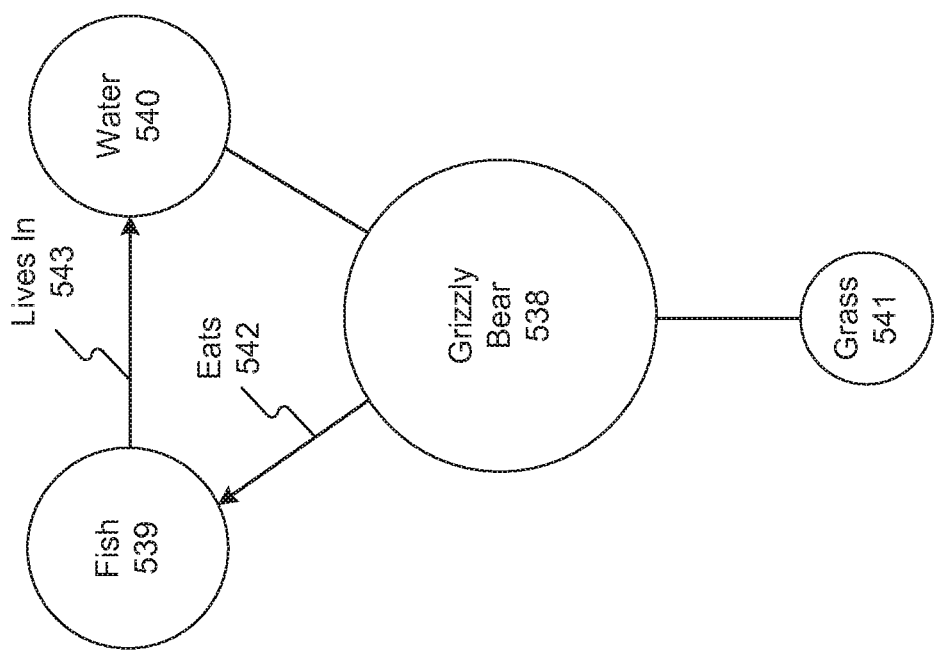

Images 520 may be assigned annotations. For example, as shown in FIG. 5B, images 520 have been assigned annotations identifying entities 521-538. Entities 521, 525, 526, 529, 532, and 536 m may be "grizzly bear" entities; entities 522, 523, 528, 531, 533, and 536 may be "fish" entities; entities 524, 527, 530, 534, and 537 may be "water" entities; and entity 538 may be a "grass" entity. As shown in FIG. 5C, an attribute entity may be selected from the identified entities 521-538. Grizzly bear entity 538 and fish entity 539 are contained in the greatest number of images 520. However, grizzly bear entity 538 is the object entity and relationship 542 is already known between grizzly bear entity 538 and fish entity 539. Accordingly, water entity 540 may be selected as the attribute entity because it is the entity contained in the greatest number of images 520 without a known relationship with grizzly bear 538.

A relationship between grizzly bear entity 538 and water entity 540 may be inferred. For example, as shown in FIG. 5D, "hunts near" may be a relationship 544 inferred between grizzly bear entity 538 and water entity 540. Relationship 544 may be inferred based on relationship 542 between grizzly bear entity 538 and fish entity 539 and relationship 543 between fish entity 539 and water entity 540. Accordingly, since it is known the grizzly bears eat fish and that fish live in water, it can be inferred that grizzly bears hunt near water based on these known relationships. Relationship 544 may be stored in a knowledge base along with grizzly bear entity 538, fish entity 539, water entity 540, and relationships 542 and 543. The combination of relationship 544, grizzly bear entity 538, and water entity 540 may represent a fact about grizzly bears (i.e., that grizzly bears hunt near water). Newly learned relationship 544 (and the fact it represents) may be used to respond to search queries such as, for example, "Where do grizzly bears hunt for food?"

Embodiments described above include computer-implemented methods, tangible non-transitory computer-readable mediums, and systems. The computer-implemented methods may be executed, for example, by at least one processor that receives instructions from a non-transitory computer-readable storage medium. Similarly, systems consistent with the present disclosure may include at least one processor and memory, and the memory may be a non-transitory computer-readable storage medium. As used herein, a non-transitory computer-readable storage medium refers to any type of physical memory on which information or data readable by at least one processor may be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium," may additionally refer to multiple structures, such a plurality of memories and/or computer-readable storage mediums. As referred to herein, a "memory" may comprise any type of computer-readable storage medium unless otherwise specified. A computer-readable storage medium may store instructions for execution by at least one processor, including instructions for causing the processor to perform steps or stages consistent with an embodiment herein. Additionally, one or more computer-readable storage mediums may be utilized in implementing a computer-implemented method. The term "computer-readable storage medium" should be understood to include tangible items and exclude carrier waves and transient signals.

Figure 6:
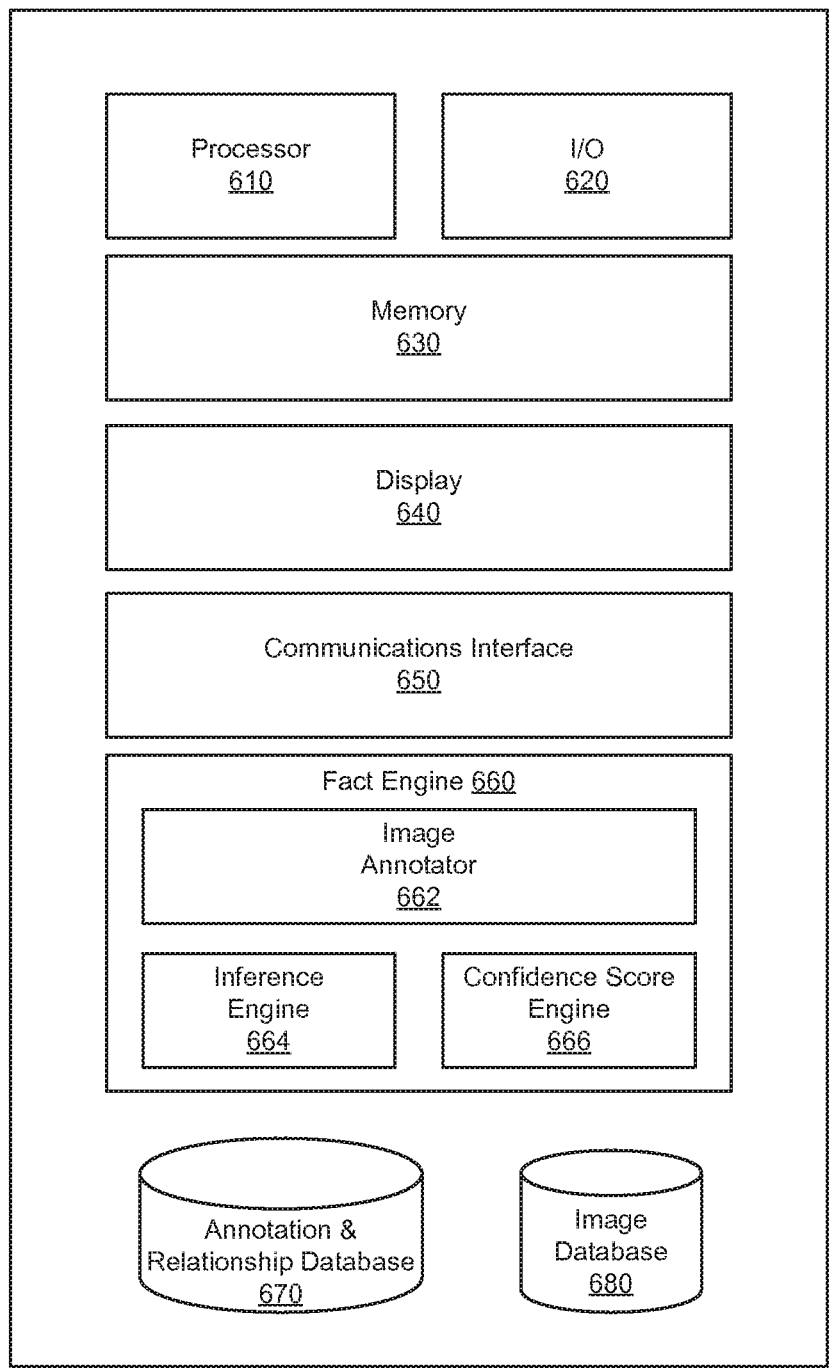
FIG. 6 illustrates an example system for implementing some embodiments and aspects of the present disclosure.

FIG. 6 illustrates an example system 600 for implementing embodiments and aspects of the present disclosure described above. By way of example, system 600 may be used to implement client 110, server 130, and/or database 140 of FIG. 1. The arrangement and number of components in system 600 is provided for purposes of illustration. Additional arrangements, number of components, and other modifications may be made, consistent with the present disclosure.

As shown in FIG. 6, system 600 may include one or more processors 610 for executing instructions. Processors suitable for the execution of instructions include, by way of example, both general and special purpose microprocessors, and any one or more processors of any kind of digital computer. System 600 may also include one or more input/output (I/O) devices 620. By way of example, I/O devices 620 may include physical keyboards, virtual touch-screen keyboards, mice, joysticks, styluses, etc. Moreover, I/O devices 620 may include loudspeakers, handset speakers, microphones, cameras, or sensors such as accelerometers, temperature sensors, or photo/light sensors.

As further illustrated in FIG. 6, system 600 may include one or more storage devices configured to store data and/or software instructions used by the one or more processors 610 to perform operations consistent with disclosed aspects and embodiments herein. For example, system 600 may include a memory 630 configured to store one or more software programs that performs functions or operations when executed by the one or more processors 610. By way of example, memory 630 may include NOR or NAND flash memory devices, Read Only Memory (ROM) devices, Random Access Memory (RAM) devices, etc. Memory 630 may also include storage mediums such as, for example, hard drives, solid state drives, tape drives, RAID arrays, etc. Although FIG. 6 shows only one memory 630, system 600 may include any number of memories 630. Further, although FIG. 6 shows memory 630 as part of system 600, memory 630 may be located remotely and system 600 may be able to access memory 630 via network 120.

System 600 may also include one or more displays 640 for displaying data and information. For example display 640 may be configured to display images and search results. Display 640 may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

System 600 may also include one or more communications interfaces 650. Communications interface 650 may allow software and data to be transferred between system 600, network 120, client 110, server 140, database 140, and/or other components. Examples of communications interface 650 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 650 may transfer software and data in the form of signals, which may be electronic, electromagnetic, optical, or other signals capable of being received by communications interface 650. These signals may be provided to communications interface 650 via a communications path (not shown), which may be implemented using wireless, wire, cable, fiber optics, radio frequency ("RF") link, and/or other communications channels.

System 600 may include a fact engine 660. By way of example, fact engine 660 may be configured to learn facts from images in accordance with the preceding disclosure. In some embodiments, fact engine 660 may include an image annotator 662, an inference engine 664, and a confidence score engine 666. Components 662-666 may be implemented as hardware modules configured to execute the functions described herein. Alternatively, processor 610 may be configured to execute the functions of components 662-666. For example, processor 610 may communicate with memory 630 that includes components 662-666 in the form of computer-executable instructions, such that processor 610 may then execute these instructions. As another example, the functions of components 662-666 may be included in processor 610 itself, such that processor 610 is configured to implement these functions.

Image annotator 662 may include one or more object recognition applications configured to assign annotations to images. Image annotator 662 may implement one or more object recognition techniques, such as edge detection, optical character recognition, face detection, geometric hashing, scale-invariant feature transform, grayscale matching, pose clustering, gradient matching, speeded up robust features (SURF), or any other object recognition techniques known in the art. The annotations may identify entities contained in the images. Image annotator 662 may crawl Internet web pages for images to annotate and/or search for images on the Internet or in an image database such as image database 680. Image annotator 662 may store assigned annotations in a database an annotation and relationship database 670.

Inference engine 664 may identify object entities and attribute entities contained in annotated images. Object entities may be identified based on the annotations assigned by image annotator 662. Inference engine 664 may group annotated images based on object entities to identify attribute entities. Inference engine 664 may also infer relationships between object entities and attribute entities. For example, inference engine 664 may infer relationships based on a spatial relationship between the object entity and attribute entity, based on a known relationship between the object entity and another attribute entity, based on a known relationship between the attribute entity and another entity, or a combination thereof. Inference engine 664 may store identified object entities and attribute entities and inferred relationships in annotation and relationship database 670.

Confidence score engine 666 may calculate confidence scores for annotations assigned by image annotator 664. For example, confidence score engine 666 may calculate confidence scores using the template matching algorithm described above in reference to FIG. 1. Confidence scores may be calculated for each annotation on a per-image basis. Additionally, confidence score engine 666 may calculate overall confidence scores by aggregating confidence scores across a plurality of images. For example, overall confidence scores may be determined by averaging the per-image confidence scores calculated for annotations across the plurality of images. Confidence score engine 666 may store the confidence scores and overall confidence scores in annotation and relationship database 670.

Annotation and relationship database 670 may be used to implement some of the functions of database 140. For example, annotation and relationship database 670 may store annotations assigned by image annotator 662, object entities, attribute entities, and relationships identified by inference engine 664, confidence scores and overall confidence scores calculated by confidence score engine 666, as well as other content described above in reference to FIG. 1. In some embodiments, annotation and relationship database 670 may include a knowledge base.

Image database 670 may be used to implement some of the functions of database 140. For example, image database 680 may store images provided by search results in response to a query or images identified by crawling Internet web pages.

The disclosed embodiments are not limited to separate programs or computers configured to perform dedicated tasks. For example, server 130 may include memory 630 that stores a single program or multiple programs. Additionally, server 130 may execute one or more programs located remotely from server 130. In some example embodiments, server 130 may be capable of accessing separate web server(s) or computing devices that generate, maintain, and provide web sites and/or event creation and notification services. Client 110 may function in a manner similar to server 130 and vice-versa.

In the preceding specification, various exemplary embodiments and features have been described with reference to the accompanying drawings. It will, however, be evident that various modifications and changes may be made thereto, and additional embodiments and features may be implemented, without departing from the broader scope of the invention as set forth in the claims that follow. The specification and drawings are accordingly to be regarded in an illustrative rather than restrictive sense.

For example, advantageous results still could be achieved if the steps or operations of the disclosed techniques were performed in a different order and/or if components in the disclosed systems were combined in a different manner and/or replaced or supplemented by other components. Moreover, while embodiments of the present disclosure have been described with reference to the processing of point-of-interest data, embodiments of the present disclosure may be applied to process and ingest other types of data. Other implementations are also within the scope of the following exemplary claims.

Therefore, it is intended that the disclosed embodiments and examples be considered as exemplary only, with a true scope of the present disclosure being indicated by the following claims and their equivalents.

What is claimed is:

1. A system for enriching a knowledge base for search queries, the system comprising:
    a memory device that stores a set of instructions; and
    at least one processor that executes the instructions to:
        assign annotations to images stored in a database, the annotations identifying entities contained in the images;
        select, based on the assigned annotations, an object entity among the entities;
        identify, based on the selected object entity, a subset of the images, based on each image in the subset of the images containing the selected object entity;
        determine at least one attribute entity using the subset of the images containing the selected object entity, wherein in determining the at least one attribute entity using the subset of the images the at least one processor is to:
            identify an entity, from among the entities and that is in addition to the object entity, occurring most frequently in the subset of the images containing the object entity, and
            select the entity as the at least one attribute entity, based on the entity occurring most frequently in the subset of the images;
        infer a relationship between the object entity and the at least one attribute entity, wherein the relationship between the object entity and the at least one attribute entity represents an inferred fact as to how the object entity and the at least one attribute entity are related; and
        store the relationship in the knowledge base.

2. The system according to claim 1, wherein the at least one processor executes the instructions to provide, based on the relationship, the at least one attribute entity to a user device in response to a search query associated with the object entity.

3. The system according to claim 1, wherein the at least one processor executes the instructions to:
    assign confidence scores to the annotations, the confidence scores reflecting a likelihood that entities identified by the annotations are contained in an image;
    determine overall confidence scores for each entity by aggregating the confidence scores for each entity; and
    select the object entity based on the overall confidence scores.

4. The system according to claim 3, wherein the at least one processor executes the instructions to select an entity with the greatest overall confidence score as the object entity.

5. The system according to claim 1, wherein the at least one processor executes the instructions to infer a relationship between the object entity and the at least one attribute entity using a known relationship between the object entity and another attribute entity.

6. The system according to claim 1, wherein the at least one processor executes the instructions to infer a relationship between the object entity and the at least one attribute entity using a knowledge base.

7. The system according to claim 1, wherein the at least one processor executes the instructions to:
    search for images based on the relationship;
    infer a second relationship between the object entity and a second attribute entity based on the searched images; and
    store the second relationship in the knowledge base.

8. The system according to claim 7, wherein the at least one processor executes the instructions to infer the second relationship based on a relationship between the attribute entity and the second attribute entity.

9. The system according to claim 1, wherein the at least one processor executes the instructions to further:
    verify the inferred relationship between the object entity and the at least one attribute entity is a valid relationship, wherein in verifying the inferred relationship is a valid relationship the at least one processor is to:
        submit, to one or more databases, a search query for the at least one attribute entity to determine one or more facts about the at least one attribute entity; and determine, based on the one or more facts about the at least one attribute entity, the inferred relationship between the object entity and the at least one attribute entity is a valid relationship.

10. A computer-implemented method for enriching a knowledge base for search queries, the method performed by one or more processors and comprising:
assigning annotations to images stored in a database, the annotations identifying entities contained in the images;
selecting, based on the assigned annotations, an object entity among the entities;
identifying, based on the selected object entity, a subset of the images, based on each image in the subset of the images containing the selected object entity;
determining at least one attribute entity using the subset of the images containing the object entity, wherein determining the at least one attribute entity using the subset of the images comprises:
identifying an entity, from among the entities and that is in addition to the object entity, in the subset of the images containing the object entity, and
selecting the entity as the at least one attribute entity;
inferring a relationship between the object entity and the at least one attribute entity, wherein the relationship between the object entity and the at least one attribute entity represents an inferred fact as to how the object entity and the at least one attribute entity are related;
storing the relationship in the knowledge base; and
subsequent to storing the relationship in the knowledge base:
receiving, from a user of a client device, a search query, wherein the search query references the object entity and the relationship;
in response to receiving the search query, identifying content that is related to the at least one attribute entity, wherein identifying the content that is related to the at least one attribute entity is based on the search query referencing the object entity and the relationship and based on the stored relationship; and
providing, for display on the client device, the content related to the least the attribute entity.

11. The method according to claim 10, further comprising providing, based on the relationship, the at least one attribute entity to a user device in response to a search query associated with the object entity.

12. The method according to claim 10, further comprising:
assigning confidence scores to entities identified in the annotated images, the confidence scores reflecting a likelihood that an entity is contained in an image;
determining overall confidence scores for each entity by aggregating the confidence scores for each entity; and
selecting the object entity based on the overall confidence scores.

13. The method according to claim 12, wherein selecting the object entity includes selecting the entity with the highest overall confidence score as the object entity.

14. The method according to claim 10, wherein inferring a relationship between the object entity and the at least one attribute entity includes inferring the relationship using a known relationship between the object entity and another attribute entity.

15. The method according to claim 10, wherein the at least one processor executes the instructions to infer a relationship between the object entity and the at least one attribute entity using a knowledge base.

16. The method according to claim 10, further comprising:
searching for images based on the relationship;
inferring a second relationship between the object entity and a second attribute entity based on the searched images; and
storing the second relationship in the knowledge base.

17. The method according to claim 16, wherein inferring the second relationship includes inferring the second relationship based on a relationship between the attribute entity and the second attribute entity.

18. A non-transitory computer-readable medium comprising instructions that, when executed by at least one processor, cause the at least one processor to perform operations including:
assigning annotations to images stored in a database, the annotations identifying entities contained in the images;
selecting, based on the assigned annotations, an object entity among the entities;
identifying, based on the selected object entity, a subset of the images, based on each image in the subset of the images containing the selected object entity;
determining at least one attribute for the object entity using the subset of the images containing the object entity, wherein in determining the at least one attribute entity contained in the subset of the images the at least one processor is to perform operations including:
identifying an entity, from among the entities and that is in addition to the object entity, occurring most frequently in the annotated images containing the object entity, and
selecting the entity as the at least one attribute entity, based on the entity occurring most frequently in the subset of the images;
inferring a relationship between the object entity and the at least one attribute entity, wherein the relationship between the object entity and the at least one attribute entity represents an inferred fact as to how the object entity and the at least one attribute entity are related; and
storing the relationship in a knowledge base for search queries.

19. The medium according to claim 18, wherein the instructions cause the at least one processor to perform operations further including:
assigning confidence scores to entities identified in the annotated images, the confidence scores reflecting a likelihood that an entity is contained in an image;
determining overall confidence scores for each entity by aggregating the confidence scores for each entity; and
selecting the object entity based on the overall confidence scores.

20. The medium according to claim 18, wherein the instructions cause the at least one processor to perform operations further including:
searching for images based on the relationship;
inferring a second relationship between the object entity and a second attribute entity based on the searched images; and
storing the second relationship in the knowledge base.

21. A method for learning facts from images, the method performed by one or more processors and comprising:
identifying an object entity, among a plurality of entities, contained in annotated images;
determining an attribute entity contained in the annotated images containing the object entity, wherein determining the at least one attribute entity contained in the annotated images comprises:
  identifying an entity, from among the plurality of entities and that is in addition to the object entity, occurring most frequently in the annotated images containing the object entity, and
  selecting the entity as the at least one attribute entity, based on the entity occurring most frequently in the subset of the images;
inferring a relationship between the object entity and the attribute entity based on at least one spatial relationship, between the object entity and the attribute entity, in the subset of the images, wherein the relationship between the object entity and the at least one attribute entity represents an inferred fact as to how the object entity and the at least one attribute entity are related; and
storing the relationship in a knowledge base.

* * * * *